United States Patent Office 3,304,062
Patented Feb. 14, 1967

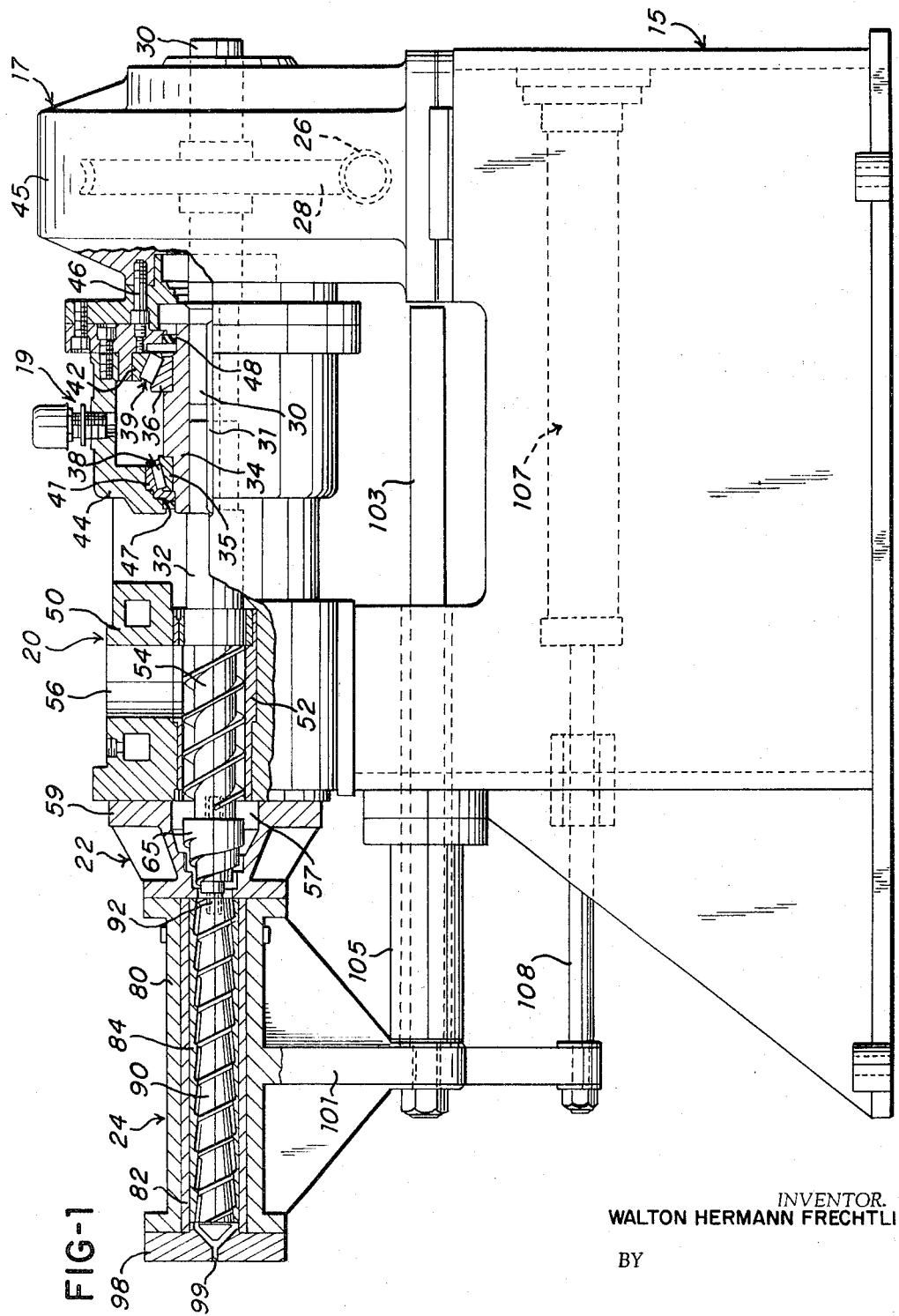

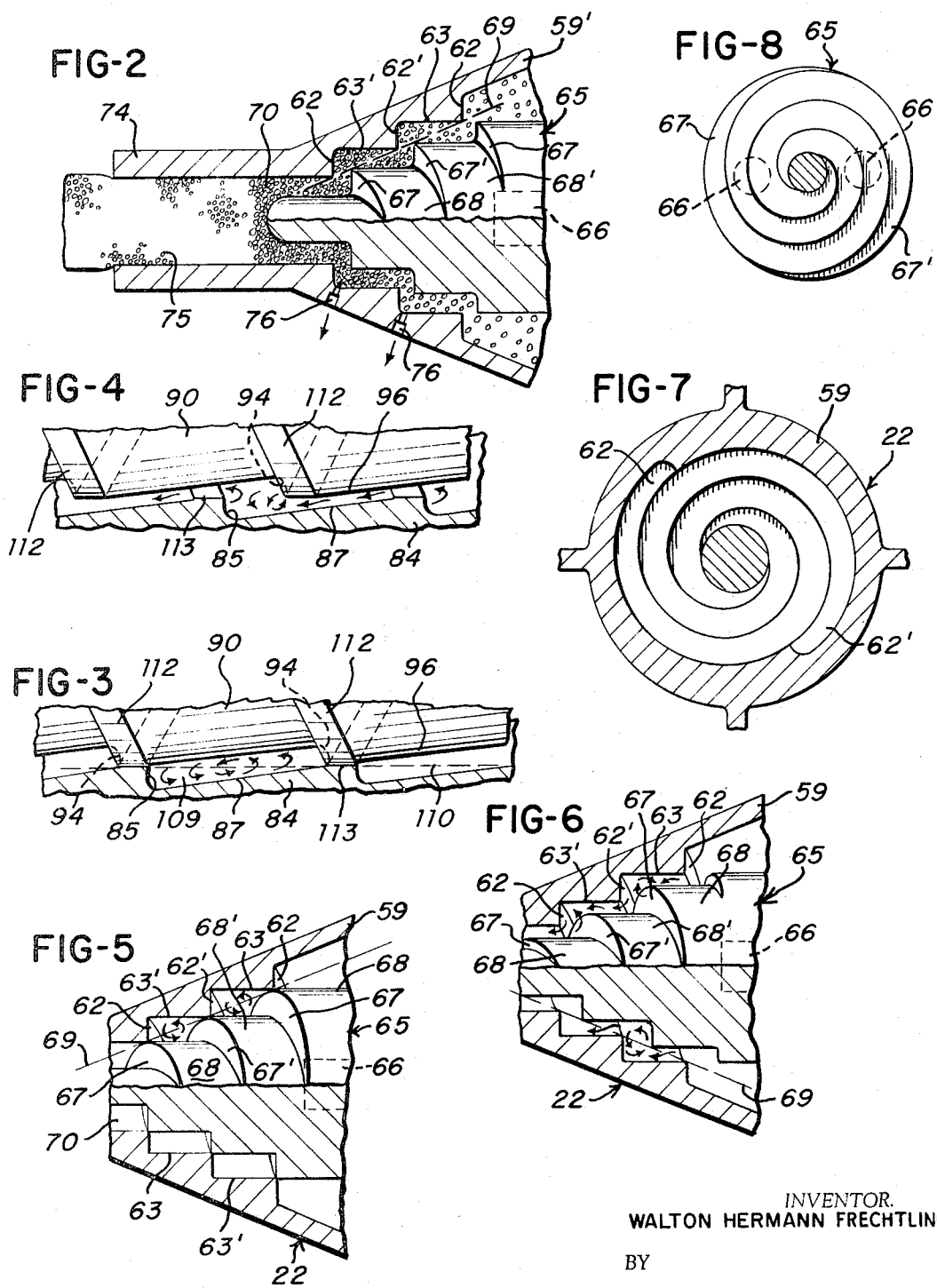

3,304,062
APPARATUS FOR MIXING AND COMPACTING MATERIAL
Walton Hermann Frechtling, Hamilton, Ohio, assignor to The Black Clawson Company, Hamilton, Ohio, a corporation of Ohio
Filed Sept. 23, 1964, Ser. No. 398,724
7 Claims. (Cl. 259—10)

This invention relates to an apparatus for mixing and compacting material, and more particularly, to a screw or worm type apparatus, having one or more stages, which produces high compaction, shearing and/or dispersive mixing actions as a result of the interaction between the rotary and stationary components of the apparatus.

The apparatus of the invention is useful for mixing, blending, expressing, pulverizing and compacting either dry solid particles of one or more materials or combinations of solid particles and liquid materials. For example, the apparatus in one form may be employed to compound dry granular plastic polymers along with other chemical materials into a thoroughly mixed homogeneous plastic material. This is accomplished by providing high shearing and dispersive mixing action between the rotary screw and the stationary housing. In another form, for example, a single stage of the apparatus of the invention may be employed to uniformly compact and shear a continuous supply of wood chips for expressing the moisture therefrom and continuously feeding the compressed chips into a pressure chamber for expansion and absorption of liquor to produce pulp for use in paper making.

Accordingly, it is a primary object of the invention to provide novel screw-type mixing and compacting apparatus, having one or more stages, which is capable of thoroughly mixing and compacting solid particles of one or more materials or combinations of solid and liquid materials by means of a novel shearing and dispersive mixing action which takes place between the rotary screw and the outer housing.

As another object, the present invention provides novel screw-type mixing and compacting apparatus which produces an intensive mixing and compacting action by the use of components which are simply constructed and economical to manufacture.

Another object of the invention is to provide apparatus as outlined above which includes a screw rotatably mounted within a stationary housing and wherein both the screw and the housing include flights which cooperate with each other to effect complete intermixing and uniform compaction of the material occupying the spaces between the flights and prevent the material from turning with the screw or clogging within the housing.

Still another object of the present invention is to provide novel screw-type mixing and compacting apparatus as outlined above which may be simply disassembled and reassembled for cleaning and servicing.

As another object, the present invention provides apparatus, as outlined above, which includes a screw rotatably mounted in a stationary housing and both of which include novel screw flights having smooth opposed faces for effecting uniform mixing of the material treated therein and to prevent the material from clogging the spaces between the flights.

It is also an object of the invention to provide novel screw-type mixing and compacting apparatus as outlined above which includes limited and uniformly balanced contact areas between the rotary screw and housing so as to reduce substantially the wear and friction heat.

Other objects and advantages of the invention will be apparent from the following description, the accompanying drawings and the appended claims.

In the drawings:
FIG. 1 is an elevational view, partially in axial section, of mixing and compacting apparatus according to the invention showing the overall combined arrangement of the primary and secondary stages;
FIG. 2 is a partial elevation view, in axial section, of the primary mixing and compacting stage of the apparatus, which may be used without the secondary stage;
FIG. 3 is an enlarged detail view, partly in axial section, of the housing and impeller of the secondary stage of the mixing and compacting apparatus according to the invention;
FIG. 4 is another enlarged detail view, partly in axial section, of the secondary stage impeller shown as advanced in relation to the housing from the position shown in FIG. 3;
FIG. 5 is an enlarged detail view, partially in axial section, of the primary mixing and compacting stage showing the relationship and mixing action between the impeller and the housing when the impeller is rotated;
FIG. 6 is another enlarged detail view, partially in axial section, of the primary mixing and compacting stage showing the impeller rotated in an advanced position from FIG. 5;
FIG. 7 is an enlarged axial view of the housing for the primary mixing and compacting stage; and
FIG. 8 is an enlarged detail view of the impeller for the primary mixing and compacting stage, as viewed axially from the small end.

Referring to the drawings, which illustrate preferred embodiments of the invention, FIG. 1 shows a completely assembled two-stage apparatus according to the invention, which includes a base member 15 supporting a gear box assembly 17, thrust bearing assembly 19, feed screw assembly 20, a primary mixing and compacting stage 22 and a secondary mixing and compacting stage 24. Power is supplied to the gear box assembly from a suitable power source in order to rotate the worm gear 26 which drives the wheel 28 rigidly mounted to the gear box shaft 30. The shaft 30 is connected to a main drive shaft 32 by a key 31 and coupling 34 on which is mounted the inner races 35 and 36 of roller bearings 38 and 39 respectively. The outer races 41 and 42 of these bearings are supported by the housing 44 which is mounted rigidly to the housing 45 of the gear box assembly 17 by screws 46 while the bearings 38 and 39, as shown in FIG. 1, are adapted to support loads in a radial direction, they primarily serve as thrust bearings for axial loading in either direction on the shaft 32. The lip seals 47 and 48 serve to retain lubricant within the bearing assembly 19 and to prevent the material within the feed screw assembly 20 from seeping back along the shaft 32 into the bearing assembly 19.

As can be seen in FIG. 1, the housing 44 of the bearing assembly 19 is formed integrally with the housing 50 of the feed screw assembly 20. Included as part of the housing 50 is a cylindrical sleeve 52 in which a conventional flight-type feed screw 54 is rotatably mounted with the shaft 32. Material is fed into the inlet 56 and is discharged by the screw 54 through the annular discharge opening 57 into the housing 59 of the primary mixing and compacting stage 22.

The housing 59 of the primary stage 22, as can be seen in FIGS. 1, 5 and 6, includes double internally formed radially extending spiral flights or working surfaces 62 and 62' adjoining substantially axially extending spiral faces 63 and 63' so as to defined a frusto-conical step-like configuration having an axially projected profile as shown in FIG. 7, which is non-overlapping. The two spiral working surfaces 62 and 62' are thus diametrically opposed to balance the radial loading on the housing 59, but, while only two spiral flights or working surfaces are shown, it is to be understood that more than two may be employed depending on the compacting and mixing action desired.

One important advantage of the configuration of the housing 59 is the simplified manner by which it can be constructed. Due to the fact that there is no undercut on the flights or working surfaces 62 and 62', the internal configuration of the housing 59 can be easily cast from material which is hard to machine, without requiring a core.

Rotatably mounted within the housing 59 of the primary mixing and compacting stage 22 is a screw or impeller 65 which is driven by the feed screw 54 through a pair of shear pins 66 (FIG. 8). The impeller 65 has a frusto-conical step-like external configuration which is formed similarly to the internal configuration of the housing 59, but in an opposite or reverse sense. This construction permits the impeller 65 to be cast in a metal mold which can be chilled or quenched to provide for a hardened external surface on the impeller.

As shown in FIGS. 2, 5 and 6, the spirally formed internal working surfaces 62 and 62' and faces 63 and 63' of the housing 59 cooperate with the spirally formed exterior working surfaces 67 and 67' and faces 68 and 68' of the impeller 65 to mix the material in a circulatory manner across the shear line 69 as shown by the arrows. Simultaneously the material is compressed or compacted radially inward toward the reduced annularly shaped discharge opening 70 of the primary stage 22. Due to the fact that the spiral working surfaces are formed in a reverse sense on the impeller 65 from the housing 59, it can be seen from FIG. 5 that the contact area between the impeller 65 and the housing 59 is essentially point contact or, at most, a small area. As a result of this evenly distributed small contact area, the frictional heat which can develop as a result of the rubbing action between the impeller and the housing is reduced substantially.

With some materials, the mixing, compacting and shearing action that is received within the primary mixing and compacting stage 22 is so intensive that the secondary stage 24 is not necessary. For example, when the apparatus is used for compacting and shearing wood chips, the wood chips are so thoroughly defiberized and compacted in the primary stage that it is only necessary to equip the housing 59' with a tubular discharge portion 74, as shown in FIG. 2, which can be connected directly to the pressure chamber of a digester (not shown).

The openings 76 are provided within the wall of the housing 59' to permit moisture to escape from material being compacted in the primary stage 22. For example, when wood chips 75 are compacted in the primary stage, it is desirable to remove the moisture within the chips so that when the compacted chips leave the tubular portion 74 and enter the digester, the chips will expand and immediately absorb the cooking liquor. Of course, if expressing liquid from a material is of primary importance, the housing 59' could be provided with many holes or slots, as desired.

One important feature which is provided by the step-like configuration of the working surfaces on both the impeller 65 and the housing 59 is the minimizing of clogging of material within the housing or on the impeller while the material is being compacted. This is accomplished by the extensive circulator action of the material across the shear line 69, shown in FIG. 5, which is due to the continuously changing configuration of the space occupied by the materials between the working surfaces, as can be seen from the comparison of FIGS. 5 and 6.

With some materials, as for example, dried granular plastic polymers, it may be desirable to continue the dispersive mixing action after the material has been first mixed and compacted within the primary stage 22. To accomplish this extensive mixing and compacting action, a secondary mixing and compacting stage 24 is provided and can be employed to serve as a combined plastic compound mixer and extruder. As shown in FIG. 1, the secondary stage 24 includes a barrel 80 enclosing a sleeve 82 which, in turn, serves to retain the cylindrically shaped liner or housing 84. Formed along the interior surface of the housing 84 is a generally radially extending spiral working surface 85 which adjoins a generally axially extending face 87 to define a step-like configuration in axial cross-section, similar to the internal working surface within the housing 59, except on a substantially uniform diameter and with a substantially longer face 87 than working surface 85.

Rotatably mounted within the liner 84 is an elongated mixing impeller 90 which is driven through the threaded connection 92 by the impeller 65. As can be seen, the external surface of the mixing impeller 90 includes a generally radially extending spiral working surface 94 which adjoins a generally axially extending face 96 to define a step-like configuration in axial cross-section similar to the internal working surface within the housing 84, but formed in the reverse sense.

Referring to FIG. 1, the barrel 80 is rigidly connected at one end to the housing 59 on an axis common to the axis of the main drive shaft 32. Mounted on the opposite end of the barrel 80 is a head flange 98 which is adapted to direct the material mixed and compacted within the stages 22 and 24, out through the central opening 99.

In order to remove the barrel 80 quickly from the mixing impeller 90 after the end of the mixing operation, the barrel 80 is provided with a center support member 101 which is adapted for axial movement with a pair of guide rods 103. The guide rods are mounted for reciprocating movement within a pair of bushings 105 which are rigidly mounted to the base 15. A hydraulic cylinder 107, including a piston rod 108, is mounted on the base 15 and connected to the bottom of the support member 101 in order to move the barrel 80 axially off the mixing impeller 90 at the end of the mixing operation for simplified cleaning of the liner 84 and impeller 90.

As shown in the enlarged detail views of FIGS. 3 and 4, the spirally formed working surface 85 and face 87 within the liner 84 cooperate with the spirally formed working surface 94 and face 96 of the mixing impeller 90 to cause a circulatory dispersive mixing action back and forth across the shear line 110 as the impeller 90 is rotated. Preferably, the spirally formed working surfaces on the liner 84 and impeller 90 are provided with a corresponding land 112 and 113 respectively, which prevent a gap from forming between the liner 84 and the impeller 90 as the leading edge of the working surfaces wears down after an extended period of use.

In addition to the extensive mixing action which results from the step-like configuration of the working surface on the liner 84 and the reverse configuration on the impeller 90, this construction is desirable from a manufacturing standpoint in that the step-like contour can easily be machined into a straight cylindrical surface. Accordingly, the liner 84 may be constructed from seamless stainless steel tubing. As a result, the machined exterior surface of the impeller 90 and the machined interior surface of the liner 84 contribute to a smooth flowing and circulative action back and forth across the shear line 110 as the impeller 90 is rotated which basically results from the continuously changing configuration of the space occupied by the material between the working surfaces. In order to balance the radial loading of the liner 84, it is desirable that both the liner 84 and the impeller 90 be provided with at least two flights or working surfaces which are diametrically opposite in the same manner as mentioned above for the primary mixing stage 22.

As can be seen from FIGS. 3, and 4, the generally axially extending spiral face 96 of the impeller 90 is substantially parallel to the generally axially extending spiral face 87 formed within the liner 84. These faces cooperate with the spirally formed working surfaces 85 and 94 to define, at the crossing of the lands 112 and 113, a mixing chamber 109 which is somewhat elongated in axial cross-section and is interrupted continuously by the working surface 94 as the impeller 90 is rotated, and as a result, provides for a constant circulatory mixing action across the shear line 110. It has been found that this mixing action which results from the constantly changing configuration of the chamber 109 prevents the material from clogging within the triangular chamber which is defined on both sides of the shear line 110 either within the liner 84 or externally on the impeller 90. Also, this non-clogging is aided by the smooth surface of the faces 87 and 96.

While the secondary stage 24, as shown in FIG. 1, is intended primarily for continued mixing action, it is to be understood that further compacting of the material can be accomplished by either decreasing the pitch of the flight or working surface or by decreasing the flight depth or by tapering the liner and impeller into a frusto-conical configuration such as the primary stage 22. This of course reduces the volumetric space which the material occupies as the material flows towards the opening 99. Furthermore, the degree of compaction of the material can also be determined by controlling the size of the opening 99 which, of course, determines the back up pressure within the secondary stage 24.

When it is desirable to have both mixing and substantial compaction performed on a high volume flow of material, the construction as used in the primary stage 22 has been found most desirable since the frusto-conical step-like configuration is ideally suited for high flow rate and is capable of mixing, pulverizing and compacting the material in a short axial distance. It is due to the extensive cooperation between the step-like working surfaces of impeller 65 and the housing 59 that both the impeller and the housing can be constructed with the frustoconical configuration which substantially reduces the volumetric space occupied by the material over a comparatively short axial distance. Primarily, the mixing and compacting action results from the spiral step-like working surface which is formed on the impeller 65 in a reverse sense from the spiral step-like working surface formed internally on the housing 59. It is the cooperation of these working surfaces which provides the intensified mixing of the material across the shear line 69, as shown in FIGS. 5 and 6 and described above. Without this intensified mixing action, the material would tend to clog either within the housing 59 or on the impeller 65 causing the material to rotate as a plug. This clogging action has been found to result with conventional screw-type compacting apparatus, especially when it is attempted to compact and mix the material in a relatively small axial distance.

When it is desirable to increase, decrease or otherwise control the temperature of the material as it is being mixed within the secondary stage 24, it is to be understood that conventional electrical heating units or other heating means or cooling means may be employed to control the temperature of the liner 84. It is an important feature, however, that due to the balanced condition and the minimum contact area between the impeller 90 and liner 84, the friction heat which results from the rubbing action between the impeller 90 and the liner 84 is reduced substantially. Thus when the secondary stage 24 is employed for mixing heat sensitive plastic materials, the temperature of the material can be more precisely controlled by external heaters or coolers due to the substantial reduction of the uncontrollable friction heat.

While the forms of apparatus herein described constitute preferred embodiments of the invention, it is to be understood that this invention is not limited to these precise forms of apparatus and that changes may be made therein without departing from the scope of the invention which is defined in the appended claims.

What is claimed is:

1. Apparatus for mixing and compacting material, comprising a housing having in inlet end and a discharge end and a continuous helically formed internal working surface radially disposed about a central axis and extending between said ends, said working surface within said housing being no greater in diameter at said discharge end of said housing than at said inlet end, said surface being adjoined by a generally axially extending spiral face to define a step-like cross-sectional configuration, an impeller rotatably mounted within said housing and including an external helical working surface generally radially extending and adjoined by a generally axially extending spiral face to define a step-like configuration formed substantially the same as but in the reverse sense from said working surface within said housing, corresponding said working surfaces and said faces within said housing and on said impeller cooperating to form substantially a triangle in axial cross-section with the shear line defined by said impeller and said housing, and power means for driving said impeller within said housing.

2. Apparatus as defined in claim 1 wherein said spiral faces within said housing and on said impeller each have an axial dimension substantially greater than the radial dimension of the corresponding said working surface to provide for substantial circulation and mixing of the material back and forth across said shear line.

3. Apparatus as defined in claim 1 wherein said helical working surface on said impeller faces said discharge end of said housing and said helical working surface on said housing faces said inlet end of said housing.

4. Apparatus as defined in claim 1 wherein said housing and said impeller each include a pair of diametrically opposed working surfaces and corresponding spiral faces for balancing the loading on said housing and said impeller.

5. Apparatus as defined in claim 1 wherein said housing and impeller are frusto-conical in configuration with the corresponding said spiral faces decreasing in diameter from said inlet end towards said discharge end of said housing, and said internal and external working surfaces each having a non-overlapping axially projected profile to provide for simplified casting of said housing and said impeller.

6. Apparatus as defined in claim 1 wherein said housing and impeller are elongated and substantially cylindrical in configuration for providing primarily mixing of the material between said spiral faces on said housing and said impeller.

7. Apparatus for mixing and compacting material as defined in claim 6, wherein said housing includes means defining openings for releasing liquid during compaction of the material.

References Cited by the Examiner

UNITED STATES PATENTS

| | | | |
|---|---|---|---|
| 2,295,823 | 9/1942 | Banigan et al. | 18—12 X |
| 2,564,880 | 8/1951 | Colombo | 18—12 X |
| 2,787,022 | 4/1957 | Chisholm | 18—12 |
| 2,830,104 | 4/1958 | Speckhardt et al. | 18—12 |
| 3,145,420 | 8/1964 | Joukainen et al. | 18—12 |
| 3,164,375 | 1/1965 | Frenkel | 259—9 X |
| 3,226,766 | 1/1966 | Von Zelewsky et al. | 18—12 |

IRVING BUNEVICH, *Primary Examiner.*

WALTER A. SCHEEL, J. M. BELL,
*Assistant Examiners.*